United States Patent
Reiderman et al.

(10) Patent No.: US 11,422,283 B1
(45) Date of Patent: Aug. 23, 2022

(54) REDUCING MOTION EFFECTS ON NUCLEAR MAGNETIC RESONANCE RELAXATION DATA

(71) Applicant: Halliburton Energy Services, Inc., Houston, TX (US)

(72) Inventors: Arcady Reiderman, Houston, TX (US); Songhua Chen, Houston, TX (US); Zinovy B. Krugliak, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/375,955

(22) Filed: Jul. 14, 2021

(51) Int. Cl.
  *G01V 3/34* (2006.01)
  *G01V 3/32* (2006.01)

(52) U.S. Cl.
  CPC . *G01V 3/34* (2013.01); *G01V 3/32* (2013.01)

(58) Field of Classification Search
  CPC ........ G01V 5/04; G01V 5/045; G01V 5/0066; G01V 13/00; G01V 3/34; G01V 3/32
  USPC ........................................ 324/303, 307, 329
  See application file for complete search history.

(56) References Cited

U.S. PATENT DOCUMENTS

| | | | |
|---|---|---|---|
| 6,268,726 B1 | 7/2001 | Prammer et al. | |
| 6,297,632 B1 | 10/2001 | Speier | |
| 6,459,263 B2 | 10/2002 | Hawkes et al. | |
| 6,566,874 B1 | 5/2003 | Speier et al. | |
| 6,891,369 B2 | 5/2005 | Hurlimann et al. | |
| 6,956,370 B2 * | 10/2005 | Heidler | G01V 3/32 324/303 |

(Continued)

FOREIGN PATENT DOCUMENTS

| | | | | |
|---|---|---|---|---|
| CN | 105473813 A | * | 4/2016 | ............ E21B 47/00 |
| CN | 107208477 A | * | 9/2017 | ............ E21B 47/00 |

(Continued)

OTHER PUBLICATIONS

Foreign Communication from Related Application—International Search Report and Written Opinion of the International Searching Authority, International Application No. PCT/US2021/042388, dated Apr. 13, 2022, 9 pages.

*Primary Examiner* — Patrick Assouad
*Assistant Examiner* — Sean Curtis
(74) *Attorney, Agent, or Firm* — Conley Rose, P.C.; Rodney B. Carroll

(57) ABSTRACT

A nuclear magnetic resonance (NMR) tool for use in a subterranean region, the NMR tool comprising a magnet assembly to produce a magnetic field in a volume in the region, an antenna assembly to produce an excitation in the volume, and to receive NMR signals from the volume, and an acquisition system coupled to the antenna assembly and configured to acquire a first NMR signal using a first acquisition window having a first duration, and acquire a second NMR signal using a second acquisition window having a second duration, wherein the second duration is different than the first duration, and a processor coupled to the acquisition system and configured to determine a lateral displacement of the NMR tool as a function of time based on the first and second NMR signals, and apply the lateral displacement to the first NMR signal to generate NMR relaxation data with reduced motion effects.

20 Claims, 10 Drawing Sheets

(56) References Cited

U.S. PATENT DOCUMENTS

| | | | |
|---|---|---|---|
| 7,053,611 B2 * | 5/2006 | Freedman | G01N 24/081 324/303 |
| 7,180,287 B2 * | 2/2007 | Rottengatter | G01V 3/32 324/303 |
| 7,268,547 B2 | 9/2007 | Kruspe et al. | |
| 7,339,374 B2 | 3/2008 | Blanz | |
| 7,358,725 B2 | 4/2008 | Blanz | |
| 7,753,119 B2 * | 7/2010 | Chen | G01V 3/32 166/250.1 |
| 8,941,383 B2 | 1/2015 | Hopper et al. | |
| 9,784,881 B2 * | 10/2017 | Jachmann | G01R 33/3875 |
| 10,126,457 B2 * | 11/2018 | Coman | E21B 49/00 |
| 10,247,684 B2 * | 4/2019 | Valori | E21B 49/00 |
| 10,539,705 B2 * | 1/2020 | Coman | G01V 3/38 |
| 10,768,334 B2 * | 9/2020 | Jachmann | G01V 3/32 |
| 10,961,848 B2 * | 3/2021 | Li | G01R 33/3808 |
| 10,969,517 B2 * | 4/2021 | Jachmann | G01V 3/32 |
| 11,060,398 B2 * | 7/2021 | Butler | E21B 47/13 |
| 2004/0188140 A1 * | 9/2004 | Chen | G01V 3/32 175/17 |
| 2005/0248342 A1 * | 11/2005 | Rottengatter | G01V 3/32 324/303 |
| 2005/0270023 A1 * | 12/2005 | Freedman | G01V 3/32 324/303 |
| 2015/0061664 A1 * | 3/2015 | Reiderman | G01N 24/081 324/303 |
| 2016/0116629 A1 * | 4/2016 | Coman | G01V 3/32 324/303 |
| 2016/0202384 A1 | 7/2016 | Utsuzawa et al. | |
| 2016/0245764 A1 * | 8/2016 | Valori | E21B 49/00 |
| 2017/0003413 A1 * | 1/2017 | Jachmann | G01R 33/3808 |
| 2017/0254919 A1 * | 9/2017 | Coman | G01R 33/448 |
| 2018/0003852 A1 * | 1/2018 | Jachmann | E21B 47/00 |
| 2019/0056524 A1 * | 2/2019 | Reiderman | G01R 33/3808 |
| 2019/0346385 A1 | 11/2019 | Reiderman | |
| 2020/0217192 A1 * | 7/2020 | Li | G01V 3/32 |
| 2020/0291763 A1 | 9/2020 | Utsuzawa et al. | |
| 2020/0319367 A1 * | 10/2020 | Xing | G01R 33/3678 |
| 2020/0319372 A1 * | 10/2020 | Jachmann | G01V 13/00 |
| 2021/0062643 A1 * | 3/2021 | Butler | G01V 3/34 |

FOREIGN PATENT DOCUMENTS

| | | | | |
|---|---|---|---|---|
| CN | 109154189 A | * | 1/2019 | G01N 24/081 |
| CN | 110199087 A | * | 9/2019 | G01R 33/3808 |
| WO | WO-2005109038 A2 | * | 11/2005 | G01N 24/081 |
| WO | WO-2016140783 A1 | * | 9/2016 | E21B 47/00 |
| WO | WO-2017151870 A1 | * | 9/2017 | E21B 47/12 |
| WO | WO-2019066919 A1 | * | 4/2019 | E21B 47/00 |
| WO | WO-2020204947 A1 | * | 10/2020 | G01N 24/081 |
| WO | WO-2021040739 A1 | * | 3/2021 | E21B 47/00 |
| WO | WO-2022011228 A1 | * | 1/2022 | |

\* cited by examiner

REDUCING MOTION EFFECTS ON NUCLEAR MAGNETIC RESONANCE RELAXATION DATA

TECHNICAL FIELD

This present disclosure relates generally to nuclear magnetic resonance (NMR) logging, for example for obtaining NMR data from a subterranean region. More specifically, this disclosure relates to a method and apparatus for NMR data acquisition and processing.

BACKGROUND

In the field of logging (e.g., wireline logging, logging while drilling (LWD) and measurement while drilling (MWD)), NMR tools are used to explore the subsurface based on the magnetic interactions with subsurface material. Some downhole NMR tools include a magnet assembly that produces a static magnetic field, and a coil assembly that generates radio frequency (RF) control signals and detects magnetic resonance phenomena in the subsurface material. Properties of the subsurface material can be identified from the detected phenomena. These properties may include estimates of the amounts of bound and free fluids, fluid types (e.g., oil, gas, and water), permeability, and other properties of interest.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
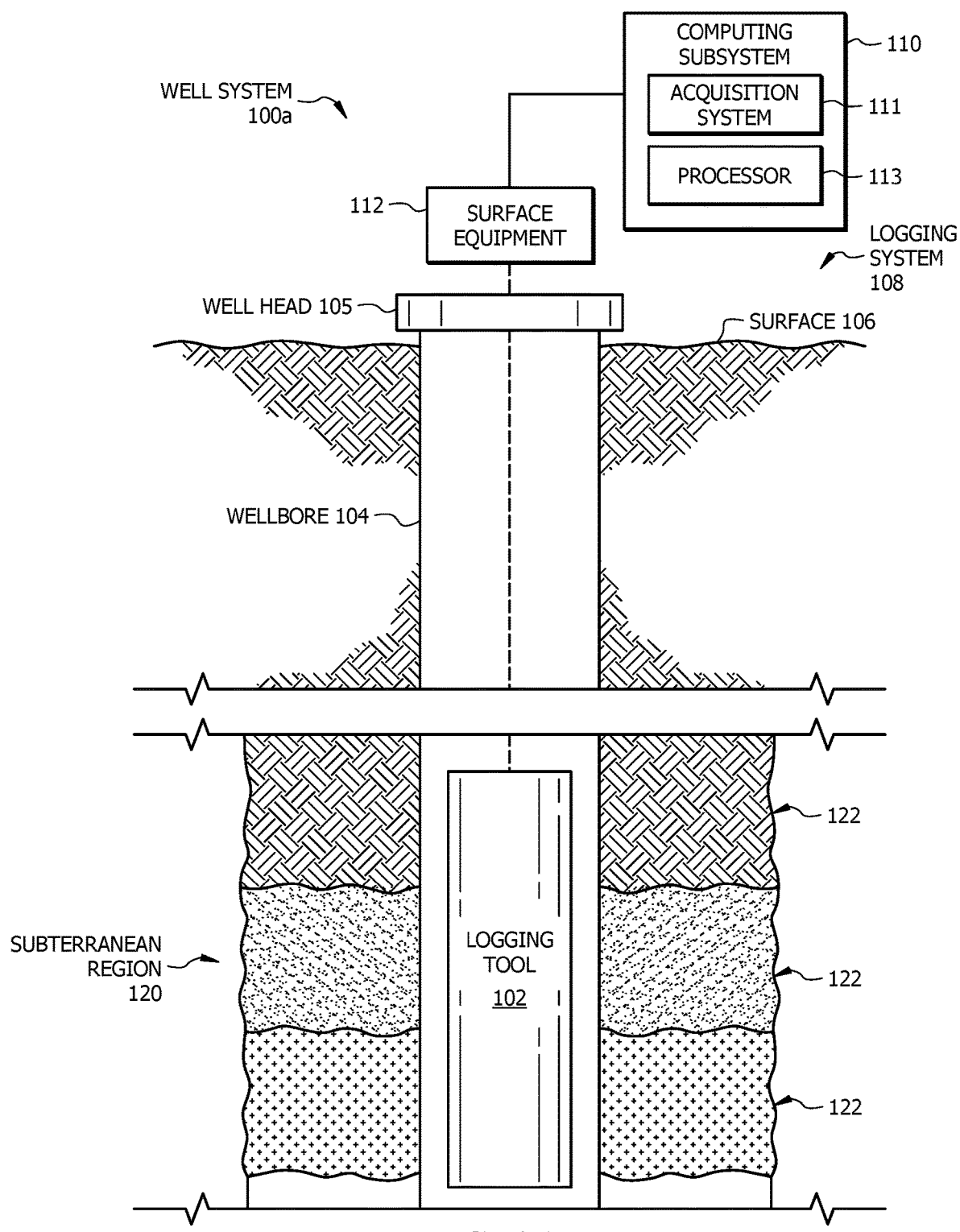
FIG. 1A is a diagram of an example well system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

NMR logging is possible because when an assembly of magnetic moments, such as those of hydrogen nuclei, are exposed to a static magnetic field they tend to align along the direction of the magnetic field, resulting in bulk magnetization. The rate at which equilibrium is established in such bulk magnetization upon provision of a static magnetic field is characterized by the parameter T1, referred to as the spin-lattice relaxation time. Another related NMR logging parameter is T2, referred to as the spin-spin relaxation time constant (also referred to as the transverse relaxation time), which is an expression of the relaxation due to nuclear spins dephasing.

NMR tools generally measure the time for hydrogen nuclei present in the earth formation to realign their spin axes, and consequently their bulk magnetization, either with an externally applied magnetic field, or perpendicularly to the magnetic field, after momentary reorientation due to the application of specific RF pulses. The externally applied magnetic field is typically provided by a magnet disposed in the tool. The spin axes of the hydrogen nuclei in the earth formation are, in the aggregate, caused to be aligned with the magnetic field induced in the earth formation by the magnet. The NMR tool also includes an antenna positioned near the magnet and shaped so that a pulse of RF power conducted through the antenna induces a magnetic field in the earth formation orthogonal to the field induced by the magnet. The RF pulse has a duration predetermined so that the spin axes of the hydrogen nuclei generally align themselves perpendicular both to the orthogonal magnetic field induced by the RF pulse and to the externally applied magnetic field. After the RF pulse ends, the nuclear magnetic moments of the hydrogen nuclei gradually relax (e.g., return to their alignment with the externally applied magnetic field). At the same time, a receiving antenna (which may be the same antenna as the one that generates the initial RF pulse) is electrically connected to a receiver, which detects and measures voltages induced in the receiving antenna by precessional motion of the spin axes of the nuclei.

In practice, an NMR measurement involves a plurality of pulses grouped into pulse sequences, most frequently of a type known as Carr-Purcell-Meiboom-Gill (CMPG) pulsed spin echo sequences. Each CPMG sequence consists of a 90-degree (i.e., $\pi/2$) pulse followed by a large number of 180-degree (i.e., $\pi$) pulses. The 90-degree pulse rotates the proton spins into the transverse plane and the 180-degree pulses generate a sequence of spin echoes by refocusing the transverse magnetization after each spin echo.

NMR well logging data are sensitive to lateral (e.g., radial) motion of the NMR tool. In an example in which the NMR tool is used in a LWD or MWD context, the lateral motion (e.g., vibration) and rotational movement of drilling operations may cause distortion of the NMR well logging data and, in some cases, an inability to acquire a spin echo signal representing transversal NMR relaxation.

While rotational sensitivity may be reduced by designing the NMR tool to be essentially axially symmetrical, the longitudinal and lateral displacement due to NMR tool motion (e.g., vibration), such as while drilling, remains problematic for NMR data acquisition in a LWD or MWD context.

To address the foregoing, disclosed herein are methods, assemblies, and systems that include an NMR tool for use in a wellbore in a subterranean region. In particular, the NMR tool includes an acquisition system that is configured to acquire first and second NMR signals from a volume in the subterranean region. For example, an acquired spin echo signal is integrated over an acquisition window (e.g., a time domain filter) to generate a corresponding NMR signal, which includes a relaxation component and, in some cases, a motion component. The first NMR signal is acquired using a first acquisition window having a first duration, while the second NMR signal is acquired using a second acquisition window having a second duration, which is different than the first duration.

As explained further below, motion effects on the NMR tool are observable by comparing NMR signals acquired using acquisition windows having different durations. In a situation in which the NMR tool does not experience lateral motion, when the first and second NMR signals are adjusted for their different acquisition window durations (e.g., normalized) to create normalized first and second NMR signals, the normalized first and second NMR signals are substantially coincident. However, in a situation in which the NMR tool experiences lateral motion, the normalized first and second NMR signals are different. Thus, the effects of lateral motion on the NMR tool (e.g., a motion component of the NMR signal) are identifiable or determinable by acquiring the first and second NMR signals using different acquisition window durations. Accordingly, the NMR tool also includes a processor that is configured to determine the motion effects (e.g., lateral displacement of the NMR tool as a function of time) based on the first and second NMR signals. In an example, the processor is also configured to generate NMR relaxation data with reduced motion effects, such as by applying the determined lateral displacement to one of the acquired NMR signals using numerical simulation. These and other examples are described in further detail below, and with reference to the accompanying figures.

FIG. 1A is a diagram of an example well system 100*a*. The example well system 100*a* includes an NMR logging system 108 and a subterranean region 120 beneath the ground surface 106. A well system can include additional or different features that are not shown in FIG. 1A. For example, the well system 100*a* may include additional drilling system components, wireline logging system components, etc.

The subterranean region 120 can include all or part of one or more subterranean formations or zones. The example subterranean region 120 shown in FIG. 1A includes multiple subsurface layers 122 and a wellbore 104 penetrated through the subsurface layers 122. The subsurface layers 122 can include sedimentary layers, rock layers, sand layers, or combinations of these and other types of subsurface layers. One or more of the subsurface layers can contain fluids, such as brine, oil, gas, etc. Although the example wellbore 104 shown in FIG. 1A is a vertical wellbore, the NMR logging system 108 can be implemented in other wellbore orientations. For example, the NMR logging system 108 may be adapted for horizontal wellbores, slanted wellbores, curved wellbores, vertical wellbores, or combinations thereof.

The example NMR logging system 108 includes a logging tool 102 (also referred to herein as an NMR tool 102), surface equipment 112, and a computing subsystem 110. In the example shown in FIG. 1A, the logging tool 102 is a downhole logging tool that operates while disposed in the wellbore 104. The example surface equipment 112 shown in FIG. 1A operates at or above the surface 106, such as near the wellhead 105, to control the logging tool 102, and possibly to control other downhole equipment or other components of the well system 100. The example computing subsystem 110 is configured to receive and analyze logging data from the logging tool 102, such as described below in further detail. For example, the computing subsystem 110 may include at least an acquisition system 111 to acquire or receive data (e.g., from the logging tool 102) and a processor 113 to process the acquired or received data. The NMR logging system 108 may include additional or different features, and the features of the NMR logging system 108 may be arranged and operated as represented in FIG. 1A or in another manner.

In some instances, all or part of the computing subsystem 110 can be implemented as a component of, or can be integrated with one or more components of the surface equipment 112, the logging tool 102 or both. In some cases, the computing subsystem 110 can be implemented as one or more computing structures separate from the Surface equipment 112 and the logging tool 102.

In some implementations, the computing subsystem 110 is embedded in the logging tool 102, and the computing subsystem 110 and the logging tool 102 are configured to operate concurrently while disposed in the wellbore 104. For example, although the computing subsystem 110 is shown above the surface 106 in the example shown in FIG. 1A, all or part of the computing subsystem 110 may reside below the surface 106, for example, at or near the location of the logging tool 102, or integrated to the logging tool 102.

The well system 100*a* can include communication or telemetry equipment that enables communication among the computing subsystem 110, the logging tool 102, and other components of the NMR logging system 108. For example, the components of the NMR logging system 108 can each include one or more transceivers or similar apparatus for wired or wireless data communication among the various components. For example, the NMR logging system 108 can include systems and apparatus for optical telemetry, wireline telemetry, wired pipe telemetry, mud pulse telemetry, acoustic telemetry, electromagnetic telemetry, or a combination of these and other types of telemetry. In some cases, the logging tool 102 is configured to receive commands, status signals, or other types of information from the computing subsystem 110 or another source. In some cases, the computing subsystem 110 receives logging data, status signals, or other types of information from the logging tool 102 or another source.

The computing subsystem 110 may include a program memory that is configured to store executable instructions of one or more software programs corresponding to the functions described herein. The program memory may physically reside within computing subsystem 110 or at other computing resources accessible to computing subsystem 110, such as within the local memory resources of other memory devices and storage devices coupled to the computing subsystem 110, or within a server or other network-accessible memory resources accessible by the computing subsystem 110, or distributed among multiple locations. In any case, this program memory constitutes a non-transitory computer-readable medium that stores executable computer program instructions, according to which the operations described in this specification are carried out by computing subsystem 110, or by a server or other computer coupled to computing subsystem 110 (e.g., via network interfaces). The computer-executable software instructions corresponding to software programs to perform the functions described herein may have originally been stored on a removable or other non-volatile computer-readable storage medium (e.g., a DVD disk, flash memory, or the like), or downloadable as encoded information on an electromagnetic carrier signal, in the form of a software package from which the computer-executable software instructions were installed by computing subsystem 110 in the conventional manner for software installation. It is contemplated that those skilled in the art will be readily able to implement the storage and retrieval of the applicable data, program instructions, and other information useful in connection with this embodiment, in a suitable manner for each particular application, without undue experimentation.

In examples of this disclosure, NMR logging operations can be performed in connection with various types of downhole operations at various stages in the lifetime of a well system. Structural attributes and components of the surface equipment 112 and logging tool 102 can be adapted for various types of NMR logging operations. For example, NMR logging may be performed during drilling operations, during wireline logging operations, or in other contexts. Accordingly, the surface equipment 112 and the logging tool 102 may include, or may operate in connection with drilling equipment, wireline logging equipment, or other equipment for other types of operations. As another example, NMR logging may be performed in an offshore or subsea environment. Accordingly, the surface equipment 112 may be arranged on a drill ship or other offshore drilling vessel, and the logging tool 102 operates in connection with offshore drilling equipment, offshore wireline logging equipment, or other equipment for use with offshore operations.

Figure 2:
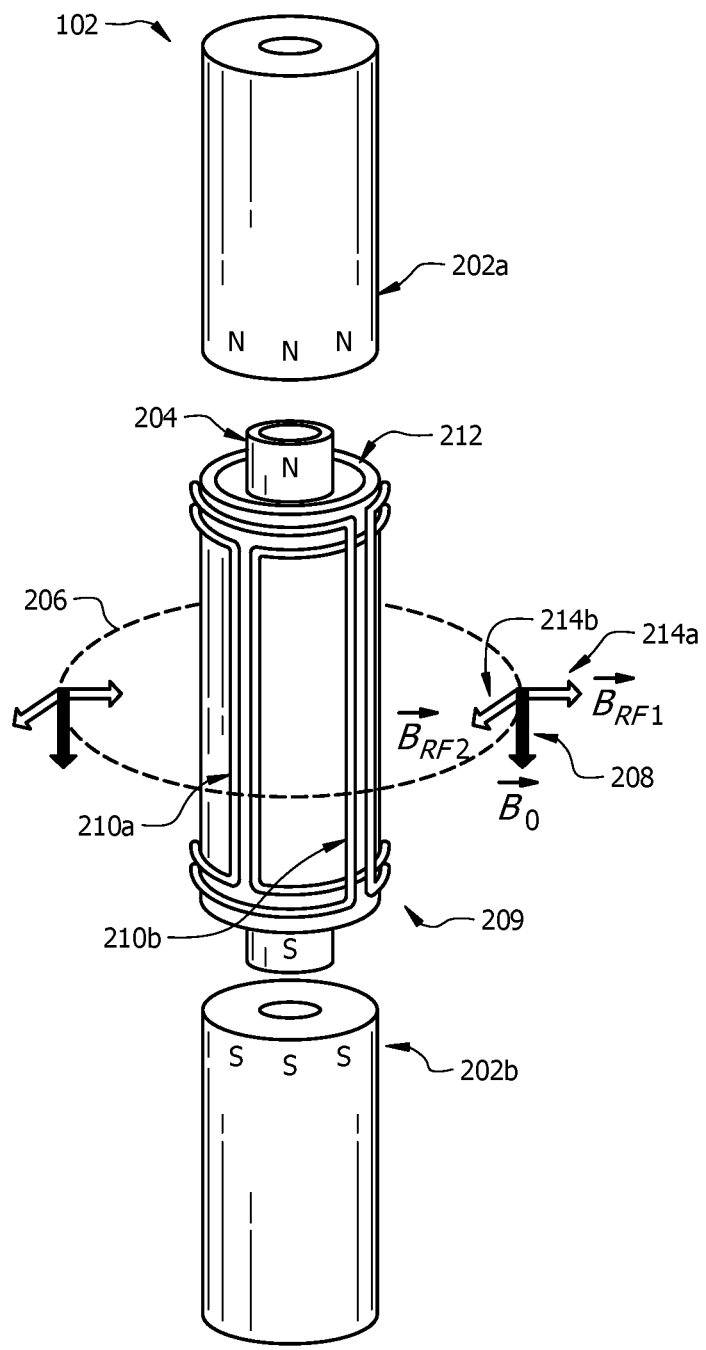
FIG. 2 is a diagram of an example downhole tool for obtaining NMR data from a subterranean region.

In some implementations, the logging tool 102 includes a magnet assembly that includes a central magnet and two end piece magnets. FIG. 2 shows an example of such a configuration, although the specific geometry and/or configuration of the logging tool 102 is not necessarily limited to that shown in FIG. 2. In some examples, the end piece magnets are spaced apart from the axial ends of the central magnet. The end pieces together with the central magnets can define four magnetic poles, which may be arranged to enhance the static magnetic field in a volume of interest (e.g., including one or more of the subsurface layers 122 or portions thereof). The logging tool 102 can also include multiple orthogonal transversal-dipole antennas. The orthogonal transversal-dipole antennas can produce circular polarized excitation in a subterranean volume and acquire a response from the volume by quadrature coil detection.

Figure 1B:
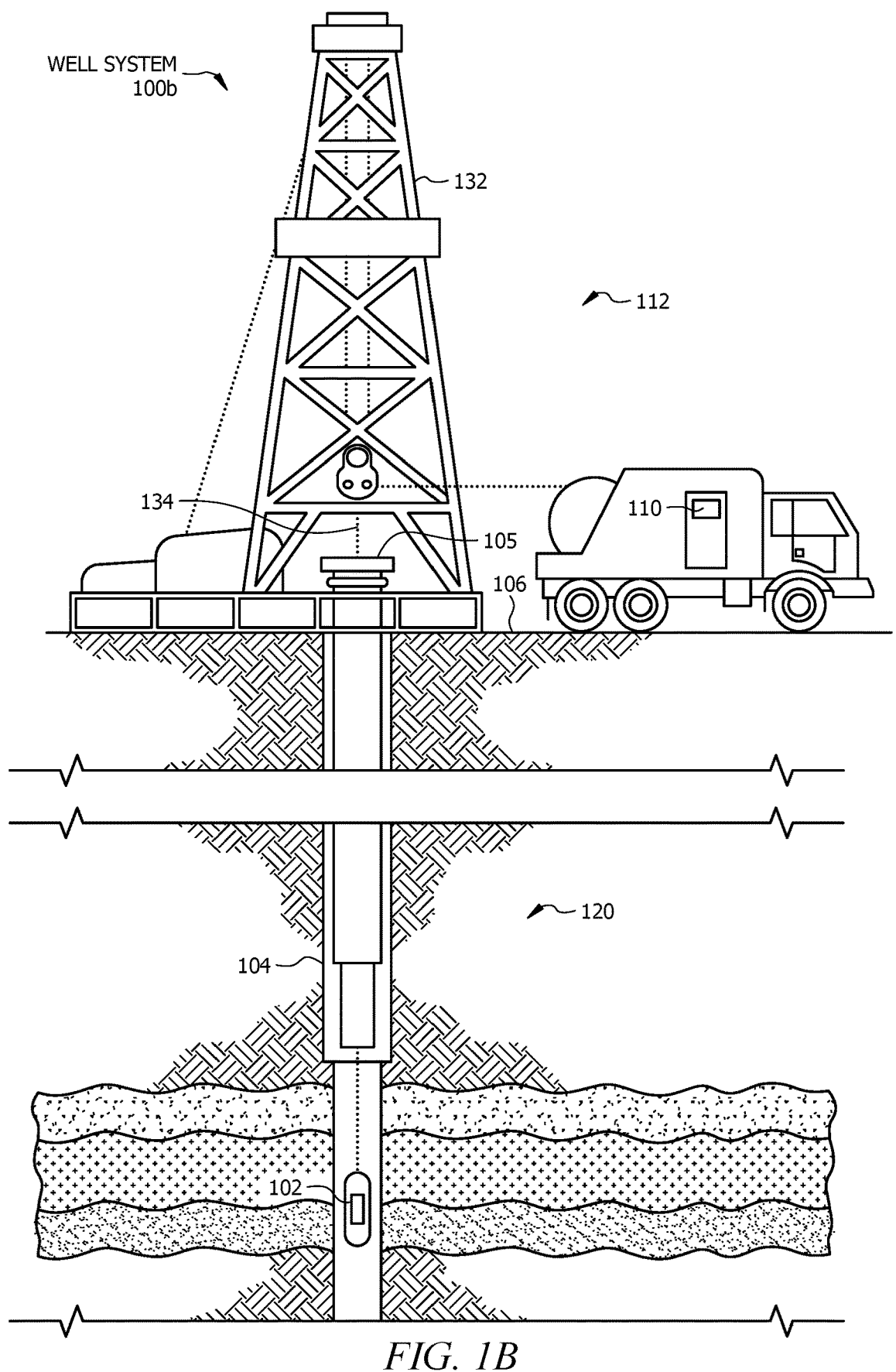
FIG. 1B is a diagram of an example well system that includes an NMR tool in a wireline logging environment.

In some examples, NMR logging operations are performed during wireline logging operations. FIG. 1B shows an example well system 100b that includes the logging tool 102 in a wireline logging environment. In some example wireline logging operations, the surface equipment 112 includes a platform above the surface 106 equipped with a derrick 132 that supports a wireline cable 134 that extends into the wellbore 104. Wireline logging operations can be performed, for example, after a drill string is removed from the wellbore 104, to allow the wireline logging tool 102 to be lowered by wireline or logging cable into the wellbore 104.

Figure 1C:
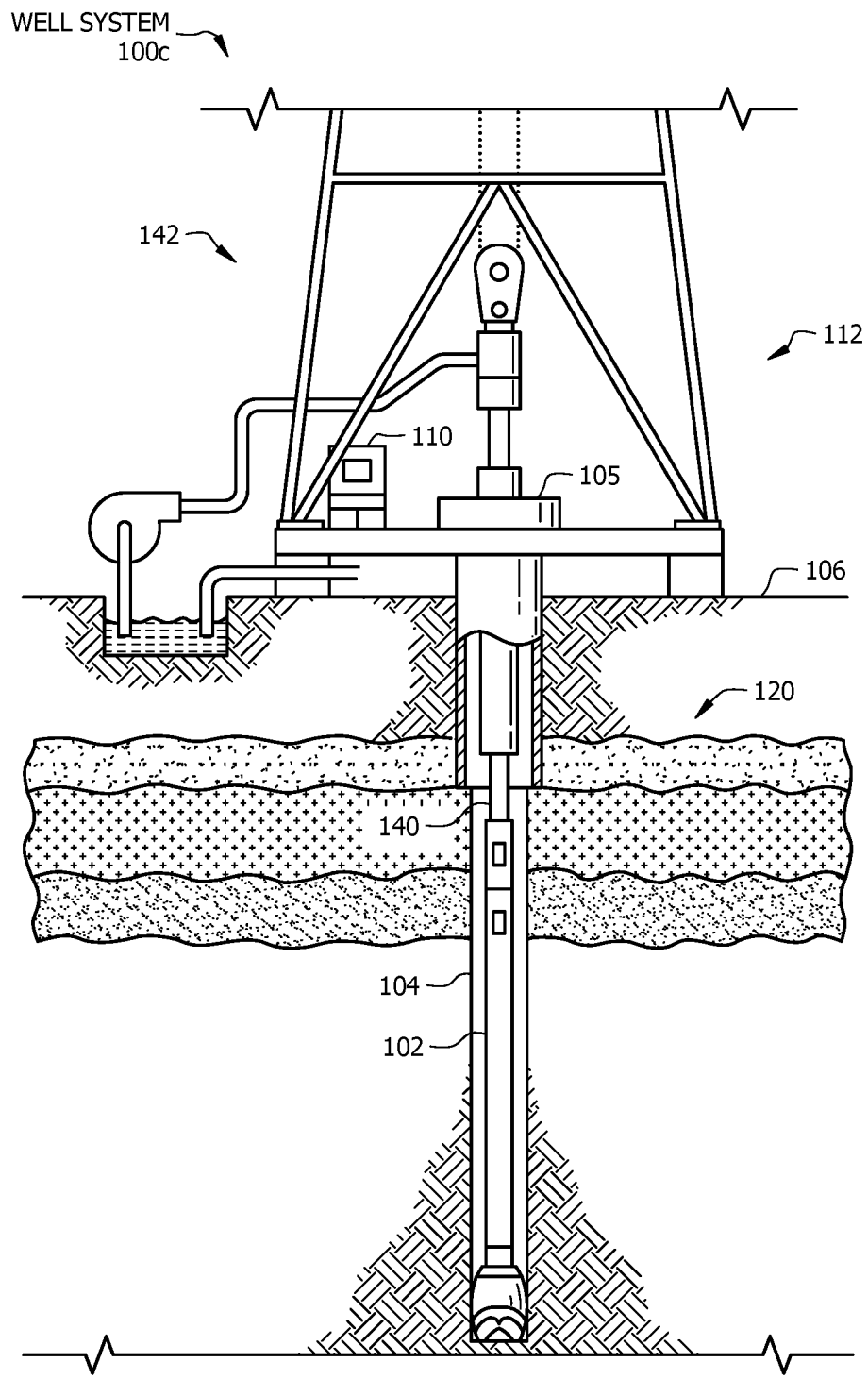
FIG. 1C is a diagram of an example well system that includes an NMR tool in an LWD environment.

In some examples, NMR logging operations are performed during drilling operations. FIG. 1C shows an example well system 100c that includes the logging tool 102 as an NMR tool 102 in a LWD/MWD environment. Drilling is commonly carried out using a string of drill pipes connected together to form a drill string 140 that is lowered through a rotary table into the wellbore 104. In some cases, a drilling rig 142 at the surface 106 supports the drill string 140, as the drill string 140 is operated to drill a wellbore penetrating the subterranean region 120. The drill string 140 may include, for example, a kelly, drill pipe, a bottomhole assembly, and other components. The bottomhole assembly on the drill string may include drill collars, drill bits, the NMR tool 102, and other components, including additional logging tools 102. The additional logging tools 102 may include MWD tools, LWD tools, and others.

In some implementations, the NMR tool 102 is configured to obtain NMR measurements from the subterranean region 120. As shown, for example, in FIG. 1B, the NMR tool 102 can be suspended in the well bore 104 by a coiled tubing, wireline cable, or another structure that connects the tool to a surface control unit or other components of the surface equipment 112. In some example implementations, the NMR tool 102 is lowered to the bottom of a region of interest and subsequently pulled upward (e.g., at a substantially constant speed) through the region of interest. As shown, for example, in FIG. 1C, the NMR tool 102 can be deployed in the wellbore 104 on jointed drill pipe, hard wired drill pipe, or other deployment hardware. In some example implementations, the NMR tool 102 collects data during drilling operations as it moves downward through the region of interest. In some example implementations, the NMR tool 102 collects data while the drill string 140 is moving, for example, while it is being tripped in or tripped out of the wellbore 104.

As explained above, NMR well logging data are sensitive to lateral (e.g., radial) motion of the NMR tool 102. In an example in which the NMR tool 102 is used in a LWD or MWD context such as in FIG. 1C, the lateral motion (e.g., vibration) and rotational movement of drilling operations may cause distortion of the NMR well logging data (e.g., due to the introduction of a motion component to the acquired NMR signal(s)) and, in some cases, an inability to acquire a spin echo signal representing transversal NMR relaxation, without such motion components. While rotational sensitivity may be reduced by designing the NMR tool 102 to be essentially axially symmetrical (e.g., as shown in FIG. 2), the longitudinal and lateral displacement due to motion of the NMR tool 102 (e.g., vibration), such as while drilling, remains problematic for NMR data acquisition in a LWD or MWD context.

As explained further below, the acquisition system 111 of the computing subsystem 110 acquires first and second NMR signals from a volume in the subterranean region 120. The first NMR signal is acquired using a first acquisition window having a first duration, while the second NMR signal is acquired using a second acquisition window having a second duration, which is different than the first duration. Motion effects on the NMR tool 102 are observable by comparing NMR signals acquired using acquisition windows having different durations. In some examples, the NMR signals acquired using acquisition windows having different durations are first normalized before being compared. Accordingly, the processor 113 is configured to determine the motion effects (e.g., lateral displacement of the NMR tool 102 as a function of time) based on the first and second NMR signals from the acquisition system 111. In an example, the processor 113 is also configured to generate NMR relaxation data with reduced motion effects, such as by applying the determined lateral displacement to one of the acquired NMR signals using numerical simulation.

In some implementations, the NMR tool 102 collects data at discrete logging points in the wellbore 104. For example, the NMR tool 102 can move upward or downward incrementally to each logging point at a series of depths in the wellbore 104. At each logging point, instruments in the NMR tool 102 perform measurements on the subterranean region 120. The measurement data can be communicated to the computing subsystem 110 for storage, processing, and analysis. Such data may be gathered and analyzed during drilling operations (e.g., during LWD operations), during wireline logging operations, or during other types of activities.

The computing subsystem 110 is configured to receive and analyze the measurement data from the NMR tool 102 to detect properties of various subsurface layers 122.

In some implementations, the NMR tool 102 obtains NMR signals by polarizing nuclear spins in the subterranean region 120 and pulsing the nuclei with a radio frequency (RF) magnetic field. Various pulse sequences (i.e., series of radio frequency pulses, delays, and other operations) can be used to obtain NMR signals, including the CPMG sequence (in which the spins are first tipped using a tipping pulse followed by a series of refocusing pulses), the Optimized Refocusing Pulse Sequence (ORPS) (in which the refocusing pulses are less than 180°), a saturation recovery pulse sequence, and other pulse sequences.

The computing subsystem 110 is configured to process (e.g., invert, transform, etc.) the acquired spin echo signals (or other NMR data) to obtain an NMR signal, such as a relaxation-time distribution (e.g., a distribution of transverse relaxation times T2, or a distribution of longitudinal relaxation times T1, or both). For example, the acquired spin echo signals are integrated using acquisition windows having different durations to generate the different NMR signals, described above. The relaxation-time distribution can be used to determine various physical properties of the formation by solving one or more inverse problems. In some cases, relaxation-time distributions are acquired for multiple logging points and used by the computing system 110 to train a model of the subterranean region. In some cases, relaxation-time distributions are acquired for multiple logging points and used by the computing system 110 to predict properties of the subterranean region.

FIG. 2 is a diagram of an example of the NMR tool 102, described above. The example NMR tool 102 includes a magnet assembly that generates a static magnetic field to produce polarization, and an antenna assembly that generates a radio frequency (RF) magnetic field to excite nuclei and acquires NMR signals from the surrounding formation. In the example shown in FIG. 2, the magnet assembly that includes the end piece magnets 202a, 202b and a central magnet 204 generates the static magnetic field in the volume of investigation 206. The poles of the central magnet 204 (e.g., north (N) and south(S)) face the like poles of the proximal end piece magnets 202a, 202b. The central magnet 204 is useful to shape and strengthen the static magnetic field in the volume of investigation 206. In this example, the volume of investigation 206 is approximately a cylindrical shell. In the volume of investigation 206, the direction of the static magnetic field (shown as the solid black arrow 208) is parallel to the longitudinal axis of the wellbore 104. In some examples, a magnet configuration with double pole strength can be used to increase the strength of the magnetic field (e.g., up to 100-150 Gauss or higher in some instances).

In the example shown in FIG. 2, the antenna assembly 209 includes two mutually orthogonal transversal dipole antennas 210a, 210b. In some instances, the NMR tool 102 can be implemented with a single transversal-dipole antenna. For example, one of the transversal-dipole antennas 210a, 210b may be omitted from the antenna assembly 209. The example transversal-dipole antenna 210a, 210b shown in FIG. 2 are placed on an outer surface of a soft magnetic core 212, which is useful for RF magnetic flux concentration. The antenna assembly 209 generates two orthogonal RF magnetic fields 214a (e.g., produced by the antenna 210a) and 214b (e.g., produced by the antenna 210b). The two RF magnetic fields 214a, 214b have a phase shift of 90°. Accordingly, the magnetic fields 214a, 214b generate a circular polarized RF magnetic field to provide NMR signals to the surrounding formation more efficiently. The same two antennas 210a, 210b are used to receive NMR signals from the surrounding formation. The received NMR signals induce corresponding signals in the orthogonal antennas 210a, 210b, which may then be processed (e.g., by the computing subsystem 110) in order to increase a signal-to-noise ratio (SNR) of the acquired NMR data as described further below.

The static magnetic field can be axially symmetric (or substantially axially symmetric), and therefore may not require broader band excitation associated with additional energy loss. The volume of investigation can be made axially long enough and thick enough (e.g., 15 cm long, and 1 cm thick) to provide immunity or otherwise decrease sensitivity to axial motion, lateral motion, or both. A longer sensitivity region can enable measurement while tripping the drill string 140. The sensitivity region can be shaped by shaping the magnets 202a, 202b, 204 and the soft magnetic material of the core 212.

In some implementations, the antenna assembly 209 additionally or alternatively includes an integrated coil set that performs the operations of the two transversal-dipole antennas 210a, 210b. For example, the integrated coil may be useful (e.g., instead of the two transversal-dipole antennas 210a, 210b) to produce circular polarization and perform quadrature coil detection. Examples of integrated coil sets that can be adapted to perform such operations include multi-coil or complex single-coil arrangements, such as, for example, birdcage coils used for high-field magnetic resonance imaging (MRI).

Compared to some example axially-symmetrical designs, the use of the longitudinal-dipole magnet and the transversal-dipole antenna assembly also has an advantage of less eddy current losses in the formation and drilling fluid (i.e., "mud") in the wellbore 104 due to a longer eddy current path than for some longitudinal-dipole antenna(s).

In some aspects, NMR measurements over multiple subvolumes can increase the data density and therefore SNR per unit time. Multiple volume measurements in a static magnetic field having a radial gradient can be achieved, for example, by acquiring NMR data on a second frequency while waiting for nuclear magnetization to recover (e.g., after a CPMG pulse train) on a first frequency. A number of different frequencies can be used to run a multi-frequency NMR acquisition involving a number of excitation volumes with a different depth of investigation. In addition to higher SNR, the multi-frequency measurements can also enable profiling the fluid invasion in the wellbore, enabling a better assessment of permeability of earth formations. Another way to conduct multi-volume measurements is to use different regions of the magnet assembly to acquire an NMR signal. NMR measurements of these different regions can be run at the same time (e.g., simultaneously) or at different times.

Figure 3:
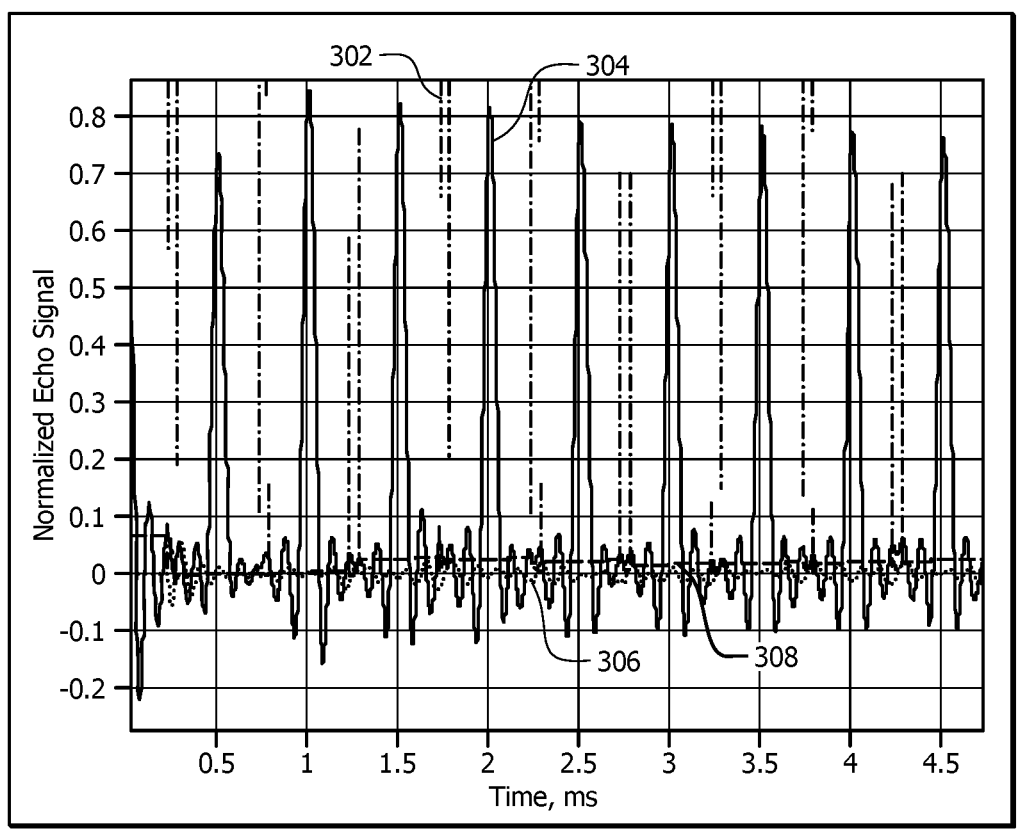
FIG. 3 is a graph of example waveforms of radio frequency (RF) refocusing pulses applied to a subterranean volume and resulting spin echo signals acquired from the volume.

FIG. 3 is a graph 300 of example waveforms of radio frequency (RF) pulses, which are demonstrated as envelopes of RF pulses notated 302, applied to a subterranean volume, such as the subterranean region 120. The graph 300 also includes resulting main, in-phase components of spin echo signals, notated 304, acquired from the volume. The spin echo signals 304 may be acquired from the volume by the NMR tool 102, such as by the antennas 210a, 210b. The graph 300 also includes an out-of-phase component of the spin echo signals, notated 306, and a longitudinal component of the spin echo signals, notated 308. The RF refocusing pulses represented by envelopes 302 and the resulting, acquired spin echo signals (e.g., the main, in-phase components 304) are shown as normalized (e.g., to a value of 1.0) magnitudes as a function of time. In the example of FIG. 3, the acquired spin echo signals 304 occur between the RF refocusing pulses 302.

Figure 4A:
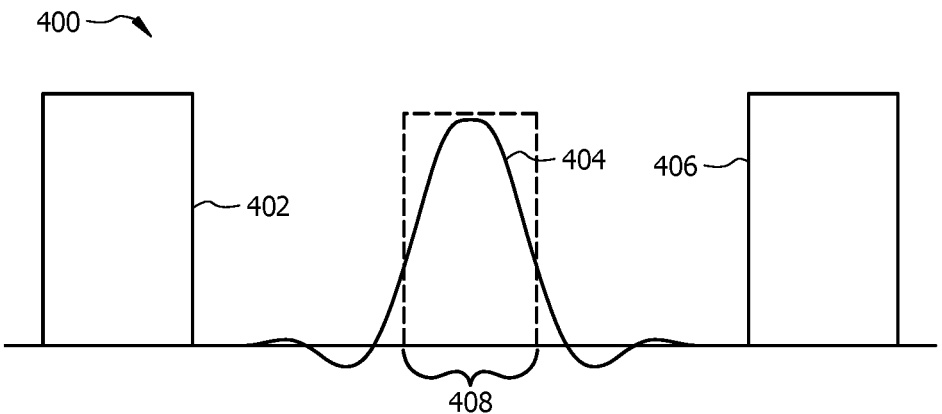
FIGS. 4A-4C are schematic examples of different acquisition window durations for a single spin echo between RF refocusing pulses.
Figure 4B:
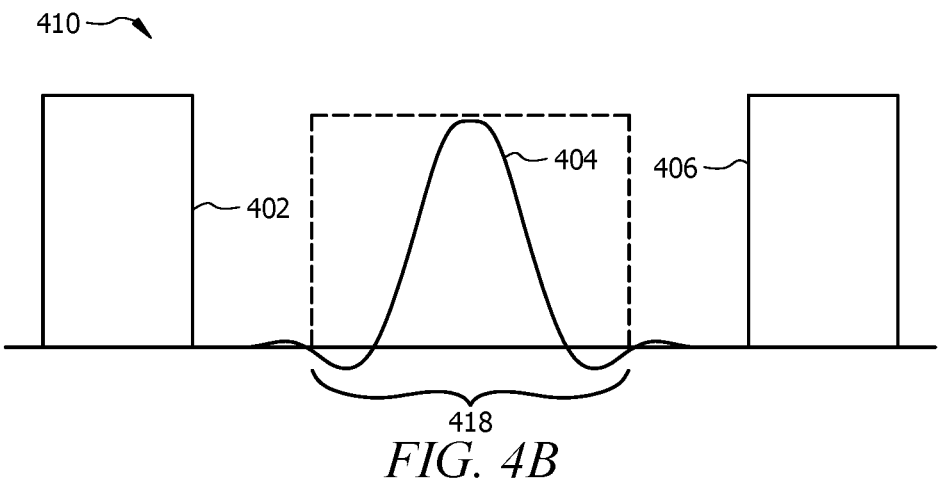
Figure 4C:
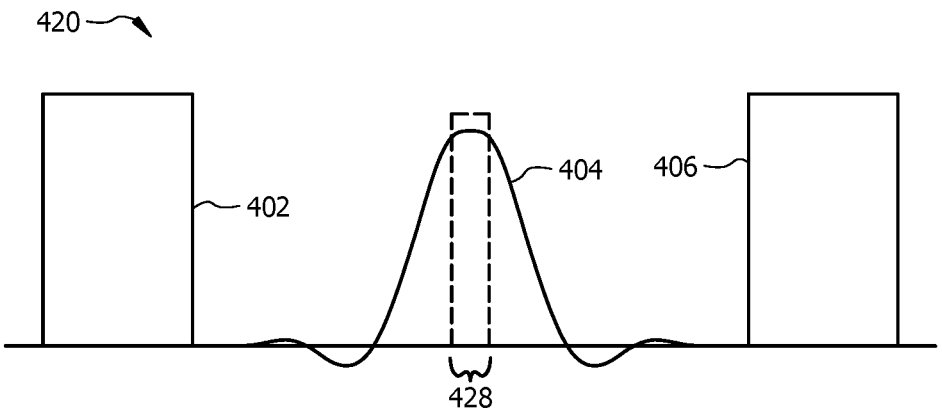

FIGS. 4A-4C show examples of different acquisition windows for a single spin echo between RF refocusing pulses. Each of FIGS. 4A-4C includes a first RF refocusing pulse 402, a resulting spin echo 404, and a second or subsequent RF refocusing pulse 406. FIG. 4A shows a first example 400 in which a first acquisition window 408 is used. FIG. 4B shows a second example 410 in which a second acquisition window 418 is used. FIG. 4C shows a third example 420 in which a third acquisition window 428 is used. The acquisition windows 408, 418, 428 correspond to time domain filters over which the spin echo signal 404 is integrated. The result of such integration is an NMR signal, which may include a relaxation component and a motion component in some examples.

In the first example 400, the first acquisition window 408 has a duration that is selected to improve or maximize SNR of the spin echo 404. In the second example 410, the second acquisition window 418 has a duration that is greater than the duration of the first acquisition window 408, and thus corresponds to a narrower-band reception in the frequency domain. In the third example 420, the third acquisition window 428 has a duration that is less than the duration of the first acquisition window 408, and thus corresponds to a wider-band reception in the frequency domain. In some cases, the second and third acquisition windows 418, 428 result in inferior SNR of the spin echo 404 relative to the first acquisition window 408. However, the third, shorter acquisition window 428 in particular may be useful to reduce the time between RF refocusing pulses 402, 406, and correspondingly the time-to-echo (TE). In some cases, a smaller TE may be useful when the NMR signal includes relatively short relaxation components to be acquired.

As explained above, NMR signals (e.g., processed spin echoes) acquired or generated using different acquisition window durations, which correspond to different reception bandwidths, have different sensitivities to motion effects, or lateral displacement, of the NMR tool 102.

Figure 5A:
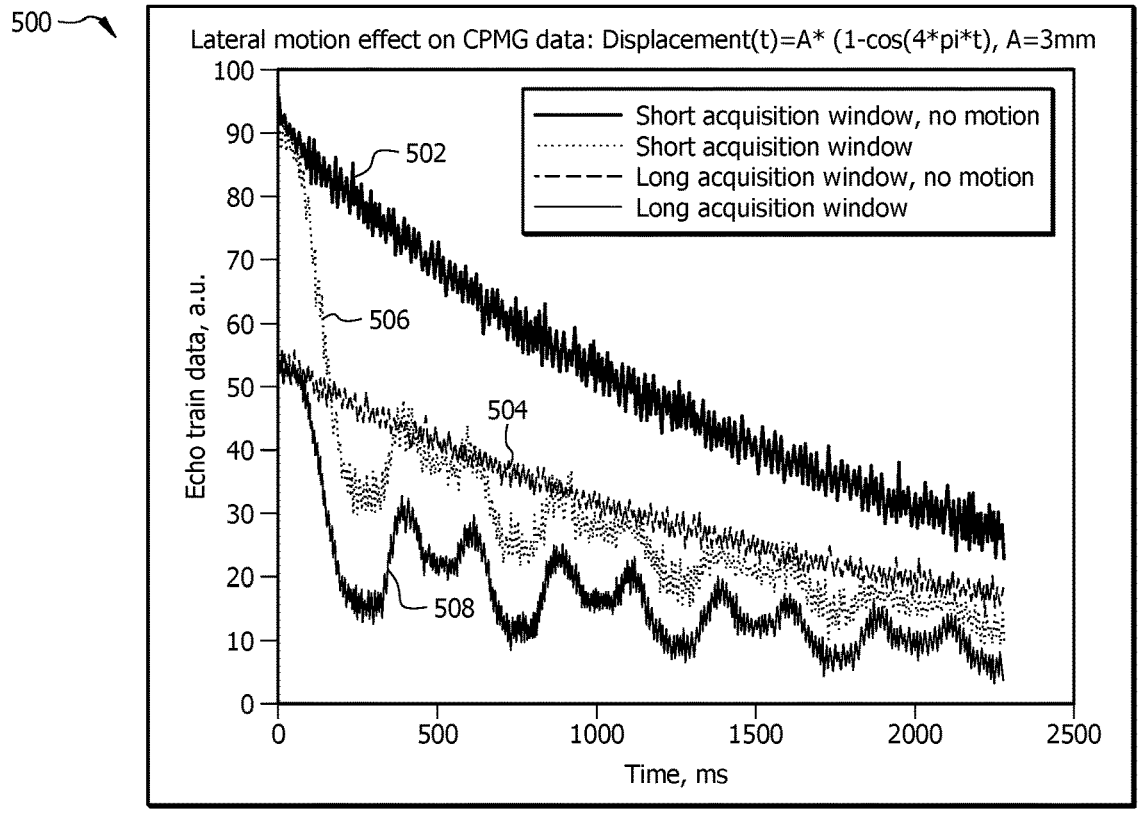
FIG. 5A is a graph of example relaxation curves of experimental NMR relaxation data for different acquisition window durations, and for which the NMR tool was and was not subjected to lateral motion.

FIG. 5A is a graph 500 of example waveforms of experimental NMR signals or relaxation data (e.g., generated from spin echo magnitudes in arbitrary (machine) units as a function of time) for different acquisition window durations, and for which the NMR tool was and was not subjected to lateral motion. The experimental NMR signals in the graph 500 was obtained using a water sample (e.g., a single-exponential relaxation), with a sensitivity volume thickness of 6 millimeters. In the example of FIG. 5A, two different acquisition windows (e.g., a relatively shorter acquisition window, and a relatively longer acquisition window) were used to derive the NMR signals from acquired spin echoes. The graph 500 includes a first NMR signal (e.g., relaxation curve) 502, which corresponds to a first (e.g., relatively shorter) acquisition window duration, and a second NMR signal (e.g., relaxation curve) 504, which corresponds to a second (e.g., relatively longer) acquisition window duration. The NMR tool 102 was not subjected to lateral motion while the first and second NMR signals 502, 504 were obtained.

The graph 500 also includes a third NMR signal (e.g., relaxation curve) 506, which corresponds to the first acquisition window duration, and a fourth NMR signal (e.g., relaxation curve) 508, which corresponds to the second acquisition window duration. The NMR tool 102 was subjected to lateral motion while the waveforms 506, 508 were obtained. In this example, the NMR tool 102 was subjected to a lateral displacement given by:

$$\text{Displacement}(t) = A \cdot [1 - \cos(4\pi \cdot t)] \quad (1)$$

In which A represents an amplitude of 3 millimeters, and t represents time as the independent variable. Accordingly, the third and fourth NMR signals 506, 508 include both a relaxation component and a motion component.

As explained above, the acquisition windows correspond to time domain filters over which the acquired spin echo signal is integrated to generate the corresponding NMR signal. Accordingly, in the example of FIG. 5A, the NMR signals 502, 504 were obtained using acquisition windows having different durations, and while the NMR tool 102 was not subjected to lateral motion. Similarly, the NMR signals 506, 508 were obtained using acquisition windows having different durations, and while the NMR tool 102 was subjected to lateral motion (e.g., as given by Equation 1, above).

Figure 5B:
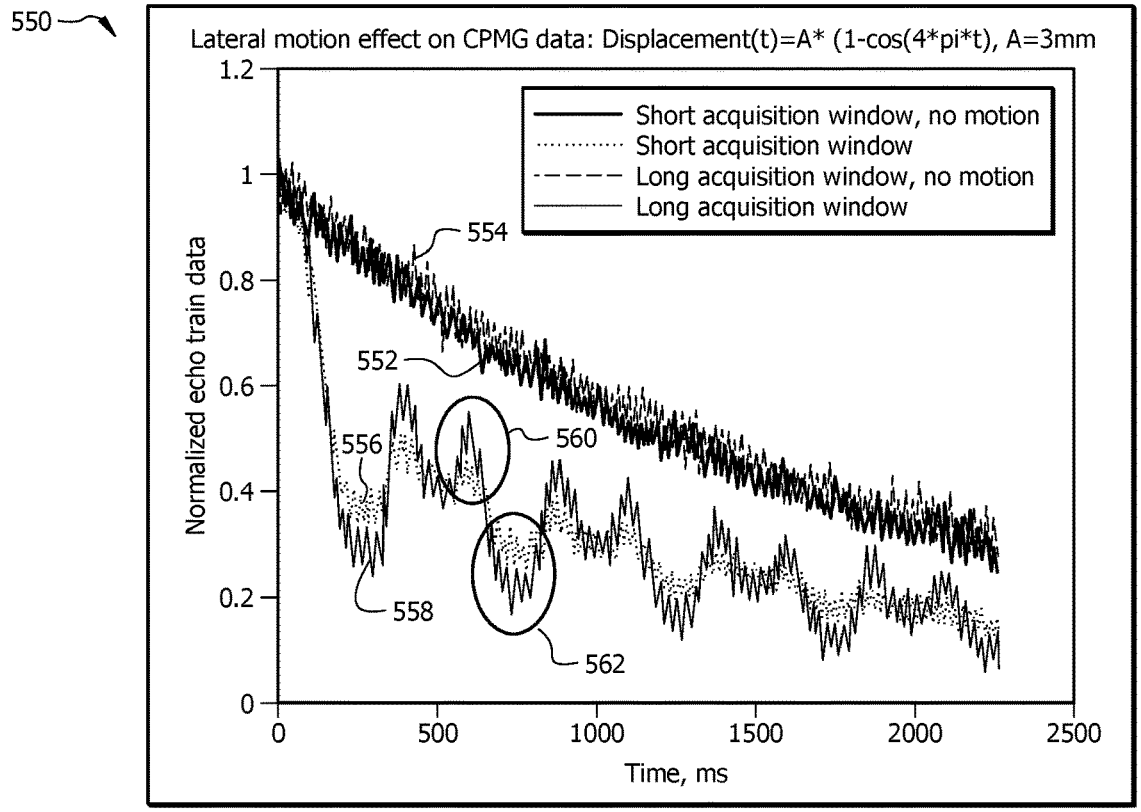
FIG. 5B is a graph of the waveforms of FIG. 5A normalized to adjust for different acquisition window durations.

FIG. 5B is a graph 550 of the NMR signals of FIG. 5A normalized (e.g., mapped to a value between 0 and 1.0) to adjust for the fact that the NMR signals were generated using different acquisition window durations. The graph 550 includes NMR signal 552, which is a normalized version of NMR signal 502 in the graph 500; NMR signal 554, which is a normalized version of NMR signal 504 in the graph 500; NMR signal 556, which is a normalized version of NMR signal 556 in the graph 500; and NMR signal 558, which is a normalized version of NMR signal 558 in the graph 500.

As demonstrated by FIG. 5B, motion effects (e.g., lateral displacement over time) on the NMR tool 102 are observable by comparing NMR signals acquired during acquisition windows having different durations. For example, in the situation where the NMR tool 102 does not experience lateral motion, which corresponds to normalized NMR signals 552, 554, those normalized NMR signals 552, 554 are substantially coincident. However, in the situation where the NMR tool 102 experiences lateral motion, which corresponds to normalized NMR signals 556, 558, those normalized NMR signals 556, 558 differ. For example, the NMR signals 556, 558 are visibly different in both peak regions 560 as well as valley regions 562. Accordingly, the motion effects on the NMR tool 102 are represented by motion component(s) in the NMR signals or relaxation data acquired using acquisition windows having different durations. The examples described herein identify or determine such motion components by analyzing the NMR signals or relaxation data acquired using acquisition windows having different durations.

In some cases, the motion effects on the NMR relaxation data (e.g., resulting in NMR signals 506, 508, 556, 558) result in NMR relaxation data that includes non-exponential components. In these cases, obtaining NMR relaxation spectra using a multi-exponential decomposition may not be possible. Accordingly, examples of this description may additionally determine or calculate a motion indicator based on the NMR signals, such as to separate the motion effects from the true NMR relaxation data attributable to the measured formation. The motion indicator may be calculated as follows:

$$MI(t)=1-E\_long\_norm/E\_short\_norm \quad (2)$$

In which MI(t) is the motion indicator as a function of time, E_norm_long represents a normalized NMR signal or relaxation data obtained over a relatively longer acquisition window, and E_norm_short represents a normalized NMR signal or relaxation data obtained over a relatively shorter acquisition window. The NMR signal 558 is an example of E_norm_long, while the NMR signal 556 is an example of E_norm_short. In other examples, the NMR signals are not normalized before the motion indicator is calculated. Generally, the motion indicator is a relationship, such as a ratio in some cases, between the NMR signals obtained using acquisition windows having different durations.

In this particular example, MI is thus equal to zero when no motion is present, because normalized NMR signals or relaxation data obtained over different acquisition window durations are substantially coincident (e.g., demonstrated by NMR signals 552, 554). For relatively small lateral displacement, such as less than the thickness of the sensitivity volume (e.g., a displacement amplitude of less than 3 mm in this example), and assuming the lateral displacement is in one dimension, the MI can be approximated as:

$$MI(t)=F[(\text{Displacement}(t))] \approx a1 \cdot \text{Displacement}(t)+ a2 \cdot \text{Displacement}^2(t) \quad (3)$$

In which the coefficients a1 and a2 depend on RF refocusing pulse parameters, such as RF pulse tip and flip angles; the receiver transfer function, such as acquisition window and shape; and the static magnetic field gradient.

Figure 6:
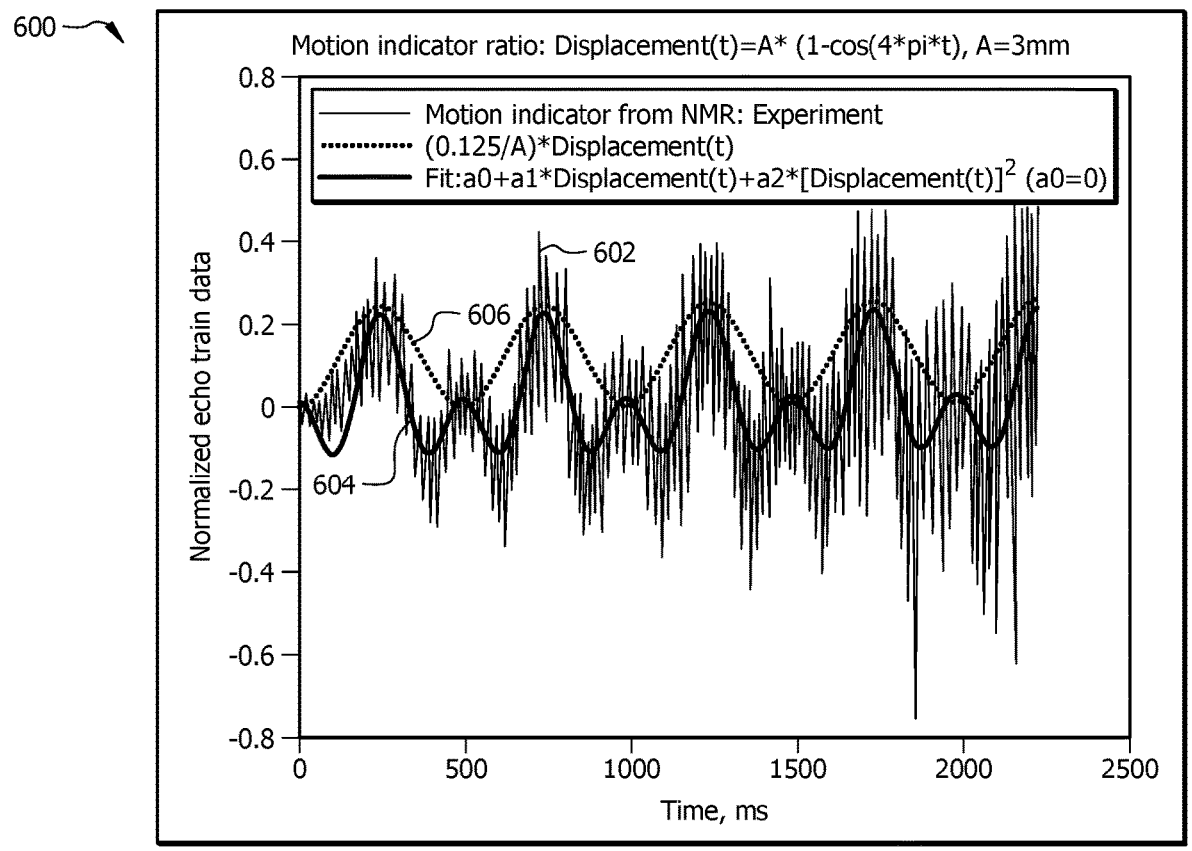
FIG. 6 is a graph of example waveform of a motion indicator and a corresponding lateral displacement of an NMR tool as a function of time.

FIG. 6 is a graph 600 of example waveforms of a motion indicator and a corresponding lateral displacement of an NMR tool as a function of time. The graph 600 includes a motion indicator waveform 602, which is calculated, for example, based on Equation 2, above, and the normalized NMR signals 556, 558. The graph 600 also includes a fitted motion indicator waveform 604, which is generated as a second-order polynomial fitting of the motion indicator waveform 602, and a lateral displacement waveform 606. The lateral displacement waveform 606 represents the lateral displacement of the NMR tool 102 in one dimension, and as a function of time, for example as given by Equation 1 in the case where the lateral displacement is known (e.g., experimentally generated). However, in other examples, the lateral displacement waveform 606 is determined from the motion indicator waveform 604, which is described further below.

In the example of FIG. 6, the motion indicator waveform 602 is shown as being calculated using the NMR signals 556, 558, which are relatively noisy, and thus the motion indicator waveform 602 is also relatively noisy. However, in other examples, such as to avoid non-linear noise transformations during subsequent NMR relaxation data processing, the motion indicator waveform 602 is determined or calculated using curves that have been fitted to the NMR signals or relaxation data (or otherwise smoothed). For example, E_norm_long represents a curve fitted to the normalized NMR data corresponding to the NMR signal 558, and E_norm_short represents a curve fitted to the normalized NMR data corresponding to the NMR signal 556.

In an example in which the motion effects are in one dimension (e.g., the NMR tool 102 experiences lateral displacement in one direction), Equation 3 is useful to calculate the lateral displacement at a given time (e.g., the lateral displacement waveform 606). For example, the motion indicator waveform 602 (or 604) may be assumed to take the form of Equation 3 (e.g., expressed as a second-order polynomial in which the independent variable is displacement of the NMR tool 102 as a function of time). In another example, the motion indicator waveform 602 (or 604) may be assumed to be expressed as an n-order polynomial in which the independent variable is displacement of the NMR tool 102 as a function of time. Further, the displacement of the NMR tool 102 as a function of time is assumed to take the form of a sinusoid, or oscillating graph, such as that given by Equation 1. Accordingly, the lateral displacement waveform 606 may be determined by considering the motion indicator 602 as an n-order polynomial dependent on displacement as a function of time, and by considering that the displacement as a function of time takes the form of a sinusoidal waveform. The lateral displacement waveform 606 is then useful to correct NMR relaxation data, for example as a preprocessing step that occurs before a subsequent inversion of, and/or further processing of, the NMR relaxation data.

In other examples, the motion effects are in more than dimension, such as in two dimensions (e.g., the NMR tool 102 experiences lateral displacement in first a first direction (e.g., x-axis) and a second direction (e.g., y-axis)). In such examples, a similar approach to the foregoing may be used to determine the lateral displacement in each of the two dimensions as a function of time. For example, the motion indicator waveform 602 (or 604) may be assumed to take the form of Equation 3 (e.g., expressed as a second-order polynomial in which the independent variable is displacement of the NMR tool 102 as a function of time) in each of the first and second dimensions. As above, the motion indicator waveform may be assumed to be expressed as an n-order polynomial in other examples. Irrespective of the ordering of the polynomial used, the displacement of the NMR tool 102 as a function of time is assumed to take the form of a sinusoid, such as that given by Equation 1, in each of the first and second dimensions.

Accordingly, the lateral displacement waveform 606 in the first dimension (e.g., x-axis) may be determined by considering the motion indicator 602 as a first n-order polynomial dependent on displacement as a function of time in the first dimension, and by considering that the displacement as a function of time takes the form of a first sinusoidal waveform in the first dimension. The lateral displacement waveform 606 in the second dimension (e.g., y-axis) may be determined by considering the motion indicator 602 as a second n-order polynomial dependent on displacement as a function of time in the second dimension, and by considering that the displacement as a function of time takes the form of a second sinusoidal waveform in the second dimension. A composite lateral displacement function is readily determinable based on the first-dimension lateral displacement waveform and the second-dimension lateral displacement waveform. Such composite lateral displacement function is then useful to correct NMR relaxation data, for example as a preprocessing step that occurs before a subsequent inversion of, and/or further processing of, the NMR relaxation data.

In some examples, the determined lateral motion (e.g., for different one- or two-dimensional (1D or 2D) motion situations) during the CPMG experiment may be numerically simulated to obtain NMR signals, and subsequently motion indicators, for these motion situations (e.g., using an equation having the form of Equation 2). Subsequently, a 1D or 2D inversion of the determined lateral motion may be used to quantify the motion (e.g., determine displacement as a function of time, similar to Equation 1), and then to calculate or apply motion corrections to the acquired echo train data. In some cases, the lateral displacement may be presented as a predetermined function of time (e.g., a combination of one or more oscillating functions, such as sine waves) having a number of parameters determined based on fitting the simulated motion indicator waveform to the motion indicator obtained from measurements (e.g., NMR signals determined from acquired spin echoes).

In some examples, the motion variation (e.g., oscillation) period is typically longer than the relaxation sampling interval (TE). To reduce the amount of data to be stored by the logging tool 102 or/and sent to the computing subsystem 110, the data acquired for different acquisition windows that are to be used to calculate motion parameters can be stored in a form of "super echoes" as averages over a number of neighboring echoes (e.g., one super echo is an average of more than one echo).

Acquired NMR signals, or the spin echoes from which NMR signals are derived, may be accompanied by artifacts (e.g., ringing or direct current (DC) voltage offset). These artifacts may be removed from the resulting NMR signals (e.g., relaxation data) by generating and processing phase-alternated pairs of CPMG trains (a version of phase cycling). In some cases, the lateral motion has different effects on each of the pair of CPMG trains. Accordingly, artifact removal may be performed separately for each individual echo train. An auxiliary sequence (in some cases, including an additional refocusing pulse) after each CPMG train may be used to acquire the artifacts data and remove them from the NMR signal(s) (e.g., relaxation data) before further processing the relaxation data.

Figure 7A:
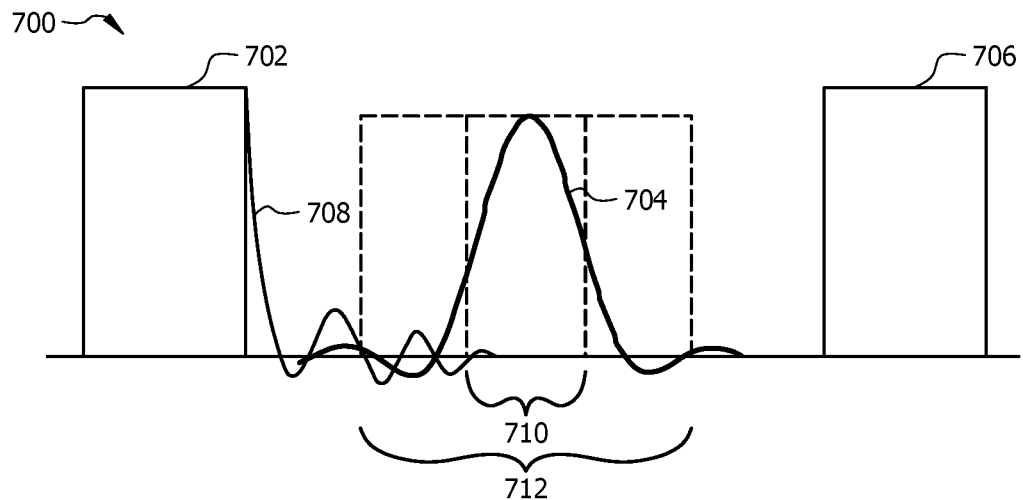
FIGS. 7A and 7B are schematic examples of various acquisition windows for generating NMR signals based on acquired spin echoes.
Figure 7B:
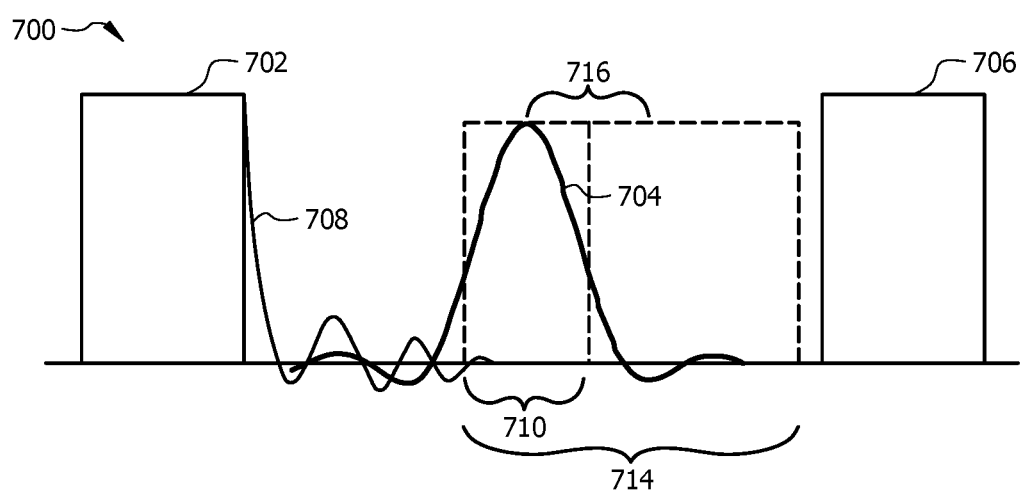

FIGS. 7A and 7B illustrate various acquisition windows for generating NMR signals based on acquired spin echoes. In particular, FIG. 7A is a first example 700 in which first and second acquisition windows are symmetrical, or substantially symmetrical, with respect to the center of a spin echo signal. FIG. 7B is a second example 750, in which first and second acquisition windows are asymmetrical with respect to the center of a spin echo signal, but where the first and second acquisition windows begin at approximately the same time.

Each of the examples 700, 750 of FIGS. 7A and 7B includes a first RF refocusing pulse 702, a resulting spin echo 704, and a second or subsequent RF refocusing pulse 706. Further, an artifact component 708 (e.g., ringing resulting from the refocusing pulse 702) is present in both examples 700, 750.

In the example 700, a first acquisition window 710 is substantially centered (e.g., in the time domain) on the acquired spin echo 704. The first acquisition window 710 may be selected to improve or optimize a SNR of the NMR signal that results from using the first acquisition window 710, such as shown in the example 400 of FIG. 4A, explained above. Further, a second acquisition window 712 is also substantially centered (e.g., in the time domain) on the acquired spin echo 704. As a result, the first and second acquisition windows 710, 712 are symmetrical about the spin echo 704. As explained above, the first and second acquisition windows 710, 712 have different durations, which enables the identification of motion components in the resulting NMR signals acquired from the spin echo 704. However, in the example 700 in which the windows 710, 712 are symmetrical, the second acquisition window 712 includes a larger portion of the artifact component 708 (e.g., ringing) that may be present after the RF pulse 702, which is undesirable in some cases.

In some cases, the duration of artifact component 708 (e.g., decay time) determines a minimum time interval between RF pulses 702, 706. Accordingly, the artifact component also determines the minimum time interval (TE) between two consecutive spin echoes, such as the spin echo 704 and a subsequent spin echo. It may be useful to reduce the TE, such as to improve relaxation spectra resolution, and increase SNR. To achieve the foregoing improvements, and in order to integrate the spin echo 704 over a longer acquisition window while still achieving a certain TE, the example 750 of FIG. 7B uses a shifted second acquisition window 714.

In the example 750, the second acquisition window 714 is shifted relative to the center of the first acquisition window 710, which is also the center of the spin echo 704. In this example 750, the center of the second acquisition window 714 is shifted by a time amount 716 from the center of the spin echo 704. In some examples, the time shift 716 is chosen such that the beginning of the second acquisition window 714 is at approximately the same time as the beginning of the first acquisition window 710, as shown in FIG. 7B. In this example, the second (e.g., longer) acquisition window 714 may extend substantially to the start of the next RF pulse 706. Irrespective of how long the second, longer acquisition window 714 extends, the second acquisition window 714 ends prior to the second, or closest subsequent RF pulse 706.

In one example, the NMR tool 102 also includes an accelerometer (or multiple accelerometers) that are configured to generate data indicative of acceleration of the NMR tool 102 in one or more directions. In some examples, a lateral velocity of the NMR tool 102 is calculated or determined (e.g., at the beginning or end of the CPMG train), and the accelerometer is useful to determine or calculate a time-dependent displacement during the CPMG train by integrating the accelerometer data. The initial velocity is one initial condition for the integration of acceleration data.

Figure 8:
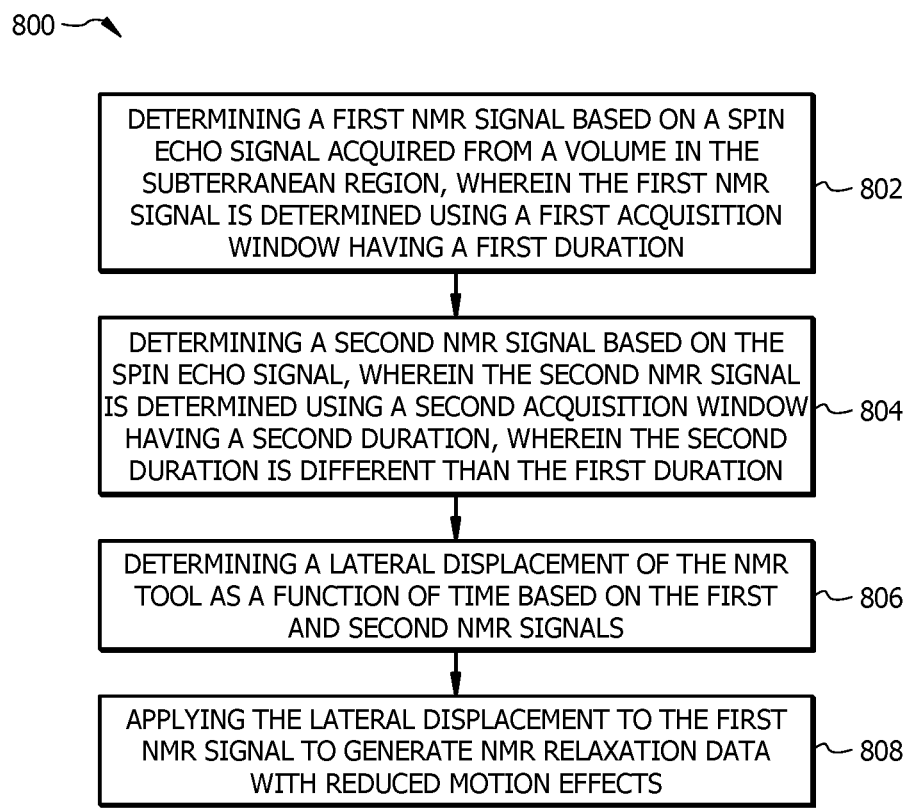
FIG. 8 is a flow chart of a method according to the disclosure.

FIG. 8 is a flow chart of a method 800 in accordance with examples described herein. In some examples, at least some of the operations of the method 800, as well as other operations described herein, can be implemented as instructions stored in a computer-readable medium and executed by one or more processors 113 (along with acquisition system 111) of the computing subsystem 110. The method 800 begins in block 802 with determining a first NMR signal based on a spin echo signal acquired from a volume in the subterranean region. The first NMR signal is determined using a first acquisition window having a first duration.

The method 800 continues in block 804 with determining a second NMR signal based on the spin echo signal. The second NMR signal is determined using a second acquisition window having a second duration, which is different than the first duration. As described, NMR signals (e.g., processed spin echoes) acquired or generated using different acquisition window durations, which correspond to different reception bandwidths, have different sensitivities to motion effects, or lateral displacement, of the NMR tool 102.

The method 800 continues in block 806 with determining a lateral displacement of the NMR tool as a function of time based on the first and second NMR signals. In one example in which the motion effects are in one dimension (e.g., the NMR tool 102 experiences lateral displacement in one direction), Equation 3, above, is useful to calculate the lateral displacement at a given time (e.g., the lateral displacement waveform 606 in FIG. 6). For example, the motion indicator waveform 602 (or 604) of FIG. 6 may be assumed to take the form of Equation 3 (e.g., expressed as a second-order polynomial in which the independent variable is displacement of the NMR tool 102 as a function of time). In another example, the motion indicator waveform 602 (or 604) may be assumed to be expressed as an n-order polynomial in which the independent variable is displacement of the NMR tool 102 as a function of time. Further, the displacement of the NMR tool 102 as a function of time is assumed to take the form of a sinusoid, or oscillating graph, such as that given by Equation 1. Accordingly, the lateral displacement waveform 606 may be determined by considering the motion indicator 602 as an n-order polynomial dependent on displacement as a function of time, and by considering that the displacement as a function of time takes the form of a sinusoidal waveform.

Finally, the method 800 concludes in block 808 with applying the lateral displacement to the first NMR signal to generate NMR relaxation data, having reduced motion effects. As described, the lateral displacement waveform 606 is then useful to correct NMR relaxation data, for example as a preprocessing step that occurs before a subsequent inversion of, and/or further processing of, the NMR relaxation data.

Additional Disclosure

The following are non-limiting, specific embodiments in accordance with the present disclosure:

A first embodiment, which is a nuclear magnetic resonance (NMR) tool for use in a wellbore in a subterranean region, the NMR tool comprising a magnet assembly configured to produce a magnetic field in a volume in the subterranean region, an antenna assembly configured to produce an excitation in the volume, and to receive NMR signals from the volume, and an acquisition system coupled to the antenna assembly and configured to acquire a first NMR signal using a first acquisition window having a first duration, and acquire a second NMR signal using a second acquisition window having a second duration, wherein the second duration is different than the first duration, and a processor coupled to the acquisition system and configured to determine a lateral displacement of the NMR tool as a function of time based on the first and second NMR signals, and apply the lateral displacement to the first NMR signal to generate NMR relaxation data with reduced motion effects.

A second embodiment, which is the NMR tool of the first embodiment, wherein the processor is further configured to determine a motion indicator responsive to a relationship between the first and second NMR signals.

A third embodiment, which is the NMR tool of the second embodiment, wherein the motion indicator comprises a ratio of the first NMR signal to the second NMR signal.

A fourth embodiment, which is the NMR tool of the second embodiment, wherein the processor is further configured to apply numerical inversion to the motion indicator to obtain the lateral displacement.

A fifth embodiment, which is the NMR tool of the fourth embodiment, further comprising an accelerometer configured to generate acceleration data of the NMR tool, wherein the acquisition system is further configured to receive acceleration data from the accelerometer, and wherein the processor is further configured to use the acceleration data to determine the lateral displacement of the NMR tool as a function of time.

A sixth embodiment, which is the NMR tool of any of the first through the fifth embodiments, wherein the first and second NMR signals are determined responsive to an acquired spin echo signal, and wherein the first acquisition window and the second acquisition window are substantially symmetric with respect to a center of the spin echo signal.

A seventh embodiment, which is the NMR tool of any of the first through the sixth embodiments, wherein the first acquisition window begins at a first time, and wherein the second acquisition window begins approximately at the first time.

An eighth embodiment, which is the NMR tool of the seventh embodiment, wherein the first and second NMR signals are acquired responsive to a first radio frequency (RF) pulse provided to the volume, and wherein at least one of the first acquisition window and the second acquisition window extends substantially to, but ends prior to, a closest subsequent RF pulse.

A ninth embodiment, which is the NMR tool of any of the first through the eighth embodiments, wherein the duration of one of the first acquisition window and the second acquisition window is selected to optimize a signal-to-noise ratio of the first NMR signal or the second NMR signal, respectively.

A tenth embodiment, which is the NMR tool of any of the first through the ninth embodiments, wherein the use of the acquired signals to obtain NMR relaxation data with reduced motion effects includes two-dimensional inversion of the NMR relaxation data.

An eleventh embodiment, which is a non-transitory, computer-readable medium containing instructions that, when executed by a processor, cause the processor to be configured to determine a first NMR signal based on a spin echo signal acquired from a volume in a subterranean region, wherein the first NMR signal is determined using a first acquisition window having a first duration, and determine a second NMR signal based on the spin echo signal, wherein the second NMR signal is determined using a second acquisition window having a second duration, wherein the second duration is different than the first duration, determine a lateral displacement of the NMR tool as a function of time based on the first and second NMR signals, and apply the lateral displacement to the first NMR signal to generate NMR relaxation data with reduced motion effects.

A twelfth embodiment, which is the non-transitory, computer-readable medium of the eleventh embodiment, wherein the instructions, when executed by the processor, further cause the processor to be configured to determine a motion indicator responsive to a relationship between the first and second NMR signals, wherein the motion indicator comprises a ratio of the first NMR signal to the second NMR signal.

A thirteenth embodiment, which is the non-transitory, computer-readable medium of any of the eleventh and the twelfth embodiments, wherein the first and second NMR signals are determined responsive to an acquired spin echo signal, and wherein the first acquisition window and the second acquisition window are substantially symmetric with respect to a center of the spin echo signal.

A fourteenth embodiment, which is the non-transitory, computer-readable medium of any of the eleventh through the thirteen embodiments, wherein the first acquisition window begins at a first time, and wherein the second acquisition window begins approximately at the first time.

A fifteenth embodiment, which is the non-transitory, computer-readable medium of the fourteenth embodiment, wherein the first and second NMR signals are determined responsive to a first radio frequency (RF) pulse provided to the volume, and wherein at least one of the first acquisition window and the second acquisition window extends substantially to, but ends prior to, a closest subsequent RF pulse.

A sixteenth embodiment, which is a method for using a nuclear magnetic resonance (NMR) tool in a wellbore in a subterranean region, the method comprising determining a first NMR signal based on a spin echo signal acquired from a volume in the subterranean region, wherein the first NMR signal is determined using a first acquisition window having a first duration, and determining a second NMR signal based on the spin echo signal, wherein the second NMR signal is determined using a second acquisition window having a second duration, wherein the second duration is different than the first duration, determining a lateral displacement of the NMR tool as a function of time based on the first and second NMR signals, and applying the lateral displacement to the first NMR signal to generate NMR relaxation data with reduced motion effects.

A seventeenth embodiment, which is the method of the sixteenth embodiment, wherein the instructions, when executed by the processor, further cause the processor to be configured to determine a motion indicator responsive to a relationship between the first and second NMR signals, wherein the motion indicator comprises a ratio of the first NMR signal to the second NMR signal.

An eighteenth embodiment, which is the method of any of the sixteenth and the seventeenth embodiments, wherein the first and second NMR signals are determined responsive to an acquired spin echo signal, and wherein the first acquisition window and the second acquisition window are substantially symmetric with respect to a center of the spin echo signal.

A nineteenth embodiment, which is the method of any of the sixteenth through the eighteenth embodiments, wherein the first acquisition window begins at a first time, and wherein the second acquisition window begins approximately at the first time.

A twentieth embodiment, which is the method of the nineteenth embodiment, wherein the first and second NMR signals are determined responsive to a first radio frequency (RF) pulse provided to the volume, and wherein at least one of the first acquisition window and the second acquisition window extends substantially to, but ends prior to, a closest subsequent RF pulse.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Use of the term "optionally" with respect to any element of a claim is intended to mean that the subject element may be present in some embodiments and not present in other embodiments. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of this disclosure. Thus, the claims are a further description and are an addition to the embodiments of this disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A nuclear magnetic resonance (NMR) tool for use in a wellbore in a subterranean region, the NMR tool comprising:
   a magnet assembly configured to produce a magnetic field in a volume in the subterranean region;
   an antenna assembly configured to produce an excitation in the volume, and to receive NMR signals from the volume; and
   an acquisition system coupled to the antenna assembly and configured to:
      acquire a first NMR signal using a first acquisition window having a first duration; and
      acquire a second NMR signal using a second acquisition window having a second duration, wherein the second duration is different than the first duration; and
   a processor coupled to the acquisition system and configured to:
      determine a lateral displacement of the NMR tool as a function of time based on the first and second NMR signals; and
      apply the lateral displacement to the first NMR signal to generate NMR relaxation data with reduced motion effects.

2. The NMR tool of claim 1, wherein the processor is further configured to determine a motion indicator responsive to a relationship between the first and second NMR signals.

3. The NMR tool of claim 2, wherein the motion indicator comprises a ratio of the first NMR signal to the second NMR signal.

4. The NMR tool of claim 2, wherein the processor is further configured to apply numerical inversion to the motion indicator to obtain the lateral displacement.

5. The NMR tool of claim 4, further comprising an accelerometer configured to generate acceleration data of the NMR tool, wherein the acquisition system is further configured to receive acceleration data from the accelerometer, and wherein the processor is further configured to use the acceleration data to determine the lateral displacement of the NMR tool as a function of time.

6. The NMR tool of claim 1, wherein the first and second NMR signals are determined responsive to an acquired spin echo signal, and wherein the first acquisition window and the second acquisition window are substantially symmetric with respect to a center of the spin echo signal.

7. The NMR tool of claim 1, wherein the first acquisition window begins at a first time, and wherein the second acquisition window begins approximately at the first time.

8. The NMR tool of claim 7, wherein the first and second NMR signals are acquired responsive to a first radio frequency (RF) pulse provided to the volume, and wherein at least one of the first acquisition window and the second acquisition window extends substantially to, but ends prior to, a closest subsequent RF pulse.

9. The NMR tool of claim 1, wherein the duration of one of the first acquisition window and the second acquisition window is selected to optimize a signal-to-noise ratio of the first NMR signal or the second NMR signal, respectively.

10. The NMR tool of claim 1, wherein the use of the acquired signals to obtain NMR relaxation data with reduced motion effects includes two-dimensional inversion of the NMR relaxation data.

11. A non-transitory, computer-readable medium containing instructions that, when executed by a processor, cause the processor to be configured to:
  determine a first NMR signal based on a spin echo signal acquired from a volume in a subterranean region, wherein the first NMR signal is determined using a first acquisition window having a first duration; and
  determine a second NMR signal based on the spin echo signal, wherein the second NMR signal is determined using a second acquisition window having a second duration, wherein the second duration is different than the first duration;
  determine a lateral displacement of the NMR tool as a function of time based on the first and second NMR signals; and
  apply the lateral displacement to the first NMR signal to generate NMR relaxation data with reduced motion effects.

12. The non-transitory, computer-readable medium of claim 11, wherein the instructions, when executed by the processor, further cause the processor to be configured to determine a motion indicator responsive to a relationship between the first and second NMR signals, wherein the motion indicator comprises a ratio of the first NMR signal to the second NMR signal.

13. The non-transitory, computer-readable medium of claim 11, wherein the first and second NMR signals are determined responsive to an acquired spin echo signal, and wherein the first acquisition window and the second acquisition window are substantially symmetric with respect to a center of the spin echo signal.

14. The non-transitory, computer-readable medium of claim 11, wherein the first acquisition window begins at a first time, and wherein the second acquisition window begins approximately at the first time.

15. The non-transitory, computer-readable medium of claim 14, wherein the first and second NMR signals are determined responsive to a first radio frequency (RF) pulse provided to the volume, and wherein at least one of the first acquisition window and the second acquisition window extends substantially to, but ends prior to, a closest subsequent RF pulse.

16. A method for using a nuclear magnetic resonance (NMR) tool in a wellbore in a subterranean region, the method comprising:
  determining a first NMR signal based on a spin echo signal acquired from a volume in the subterranean region, wherein the first NMR signal is determined using a first acquisition window having a first duration; and
  determining a second NMR signal based on the spin echo signal, wherein the second NMR signal is determined using a second acquisition window having a second duration, wherein the second duration is different than the first duration;
  determining a lateral displacement of the NMR tool as a function of time based on the first and second NMR signals; and
  applying the lateral displacement to the first NMR signal to generate NMR relaxation data with reduced motion effects.

17. The method of claim 16, wherein the instructions, when executed by the processor, further cause the processor to be configured to determine a motion indicator responsive to a relationship between the first and second NMR signals, wherein the motion indicator comprises a ratio of the first NMR signal to the second NMR signal.

18. The method of claim 16, wherein the first and second NMR signals are determined responsive to an acquired spin echo signal, and wherein the first acquisition window and the second acquisition window are substantially symmetric with respect to a center of the spin echo signal.

19. The method of claim 16, wherein the first acquisition window begins at a first time, and wherein the second acquisition window begins approximately at the first time.

20. The method of claim 19, wherein the first and second NMR signals are determined responsive to a first radio frequency (RF) pulse provided to the volume, and wherein at least one of the first acquisition window and the second acquisition window extends substantially to, but ends prior to, a closest subsequent RF pulse.

* * * * *